United States Patent
Bickham et al.

(10) Patent No.: US 7,903,918 B1
(45) Date of Patent: Mar. 8, 2011

(54) LARGE NUMERICAL APERTURE BEND RESISTANT MULTIMODE OPTICAL FIBER

(75) Inventors: Scott Robertson Bickham, Corning, NY (US); Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/709,665

(22) Filed: Feb. 22, 2010

(51) Int. Cl.
*G02B 6/02* (2006.01)

(52) U.S. Cl. ......................... 385/124; 385/126

(58) Field of Classification Search .................. 385/124, 385/126, 127
See application file for complete search history.

(56) References Cited

U.S. PATENT DOCUMENTS

| | | | |
|---|---|---|---|
| 4,176,911 A | 12/1979 | Marcatili et al. | 350/96.31 |
| 4,691,990 A | 9/1987 | Cohen et al. | 350/96.33 |
| 5,115,486 A | 5/1992 | Bader et al. | 385/124 |
| 5,940,567 A | 8/1999 | Garito | 385/127 |
| 7,587,111 B2 * | 9/2009 | de Montmorillon et al. | 385/127 |
| 7,646,955 B2 | 1/2010 | Donlagic | 385/124 |
| 2005/0141835 A1 | 6/2005 | Matthijsse et al. | 385/128 |
| 2008/0166094 A1 | 7/2008 | Bookbinder et al. | 385/124 |
| 2009/0154888 A1 | 6/2009 | Abbott, III et al. | 385/124 |

FOREIGN PATENT DOCUMENTS

JP 2006-47719 2/2008

* cited by examiner

*Primary Examiner* — Hemang Sanghavi
(74) *Attorney, Agent, or Firm* — Svetlana Z. Short (57) ABSTRACT

Bend resistant optical fibers which are multi-moded at 1300 nm include a core, an inner cladding, a low index ring and an outer cladding. The core has a graded index of refraction with a core alpha profile where $1.9 \leq \alpha_C \leq 2.1$, a maximum relative refractive index percent $\Delta_{1Max}\%$, and a numerical aperture NA of greater than 0.23. The inner cladding surrounds the core and has a maximum relative refractive index percent $\Delta_{2Max}\%$, a minimum relative refractive index percent $\Delta_{2Min}\%$, and a radial thickness $\geq 0.5$ microns, wherein $\Delta_{1Max}\% > \Delta_{2Max}\%$. The low index ring surrounds the inner cladding and has a relative refractive index percent $\Delta_3\%$, a radial thickness of at least 0.5 microns, a profile volume with an absolute magnitude of greater than $50\%\text{-}\mu m^2$, wherein $\Delta_{2Min}\% \geq \Delta_3\%$. The outer cladding surrounds the low index ring and has a relative refractive index percent $\Delta_4\%$, such that $\Delta_{1Max}\% > \Delta_4\% \geq \Delta_{2Max}\%$.

20 Claims, 3 Drawing Sheets

LARGE NUMERICAL APERTURE BEND RESISTANT MULTIMODE OPTICAL FIBER

BACKGROUND

1. Field

The present specification generally relates to optical fibers and, more specifically, to multimode optical fibers having large numerical apertures and improved bend performance.

2. Technical Background

Corning Incorporated manufactures and sells InfiniCor® 62.5 μm optical fiber, which is multimode optical fiber having a core with a maximum relative refractive index delta of about 2% and 62.5 μm core diameter, as well as InfiniCor® 50 μm optical fiber, which is multimode optical fiber having a core with a maximum relative refractive index delta of about 1% and 50 μm core diameter. It would be desirable to develop alternative multimode fiber designs, particularly optical fiber designs with high numerical apertures that would enable improved bend performance and higher bandwidth.

SUMMARY

According to one embodiment, a bend resistant optical fiber which is multi-moded at 1300 nm includes a core, an inner cladding, a low index ring and an outer cladding. The core may be formed from silica-based glass and has a graded index of refraction with a core alpha profile where $1.9 \leq \alpha_C \leq 2.1$, a maximum relative refractive index percent $\Delta_{1Max}\%$ relative to the outer cladding, and a numerical aperture NA of greater than 0.23. The inner cladding surrounds and is in direct contact with the core, the inner cladding having a maximum relative refractive index percent $\Delta_{2Max}\%$ relative to the outer cladding, a minimum relative refractive index percent $\Delta_{2min}\%$ relative to the outer cladding, and a radial thickness of at least 0.5 microns. $\Delta_{1Max}\%$ of the core may be greater than $\Delta_{2Max}\%$ of the inner cladding. The low index ring may surround and be in direct contact with the inner cladding such that the low index ring is spaced apart from the core. The low index ring has a relative refractive index percent $\Delta_3\%$ relative to the outer cladding, a radial thickness of at least 0.5 microns and a profile volume with an absolute magnitude of greater than 50%-μm². The minimum relative refractive index percent $\Delta_{2Min}\%$ of the inner cladding is greater than or equal to $\Delta_3\%$ of the low index ring. The outer cladding surrounds and is in direct contact with the low index ring and may have a relative refractive index percent $\Delta_4\%$ relative to pure silica glass such that $\Delta_{1Max}\% > \Delta_4\% \geq \Delta_{2Max}\%$.

In another embodiment, a bend-resistant optical fiber which is multi-moded at 1300 nm includes a core, an inner cladding, a low index ring, and an outer cladding. The core may be formed from silica-based glass and comprises a graded index of refraction with a core alpha profile where $1.9 \leq \alpha_C \leq 2.1$, a maximum relative refractive index percent $\Delta_{1Max}\%$ relative to the outer cladding, and a numerical aperture NA of greater than 0.23. The inner cladding may surround and be in direct contact with the core and have a graded index of refraction with an inner cladding alpha profile $\alpha_{IC}$, a maximum relative refractive index percent $\Delta_{2Max}\%$ relative to the outer cladding, and a minimum relative refractive index percent $\Delta_{2Min}\%$ relative to the outer cladding, wherein $\Delta_{1Max}\% > \Delta_{2Max}\%$. The low index ring may surround and be in direct contact with the graded index inner cladding such that the low index ring is spaced apart from the core, the low index ring having a relative refractive index percent $\Delta_3\%$ relative to the outer cladding, a radial thickness of at least 1 micron and a profile volume with an absolute magnitude of greater than 50%-μm², wherein $\Delta_{2Min}\% \geq \Delta_3\%$. The outer cladding may surround and be in direct contact with the low index ring, the outer cladding comprising a relative refractive index percent $\Delta_4\%$ relative to pure silica glass, wherein $\Delta_{1Max}\% > \Delta_4\% \geq \Delta_{2Max}\%$.

In yet another embodiment, a bend resistant optical fiber which is multi-moded at 1300 nm includes a core, an inner cladding, a low index ring and an outer cladding. The core may be formed from silica-based glass and comprises a graded index of refraction with a core alpha profile where $1.9 \leq \alpha_C \leq 2.1$, a maximum relative refractive index percent $\Delta_{1Max}\%$ relative to the outer cladding, and a numerical aperture NA of greater than 0.23. The inner cladding may surround and be in direct contact with the core, the inner cladding having a maximum relative refractive index percent $\Delta_{2Max}\%$ relative to the outer cladding, a minimum relative refractive index percent $\Delta_{2Min}\%$ relative to the outer cladding and a radial thickness of at least 0.5 microns, wherein $\Delta_{2Max}\% - \Delta_{2Min}\% \leq 0.1\%$ and $\Delta_{1Max}\% > \Delta_{2Max}\%$. The low index ring may surround and be in direct contact with the inner cladding such that the low index ring is spaced apart from the core, the low index ring having a relative refractive index percent $\Delta_3\%$ relative to the outer cladding, a radial thickness of at least 0.5 microns and a profile volume with an absolute magnitude of greater than 50%-μm², wherein the minimum relative refractive index percent $\Delta_{2Min}\%$ of the inner cladding is greater than or equal to $\Delta_3\%$. The outer cladding may surround and be in direct contact with the low index ring, the outer cladding comprising a relative refractive index percent $\Delta_4\%$ relative to pure silica glass, wherein $\Delta_{1Max}\% > \Delta_4\% \geq \Delta_{2Max}\%$.

Additional features and advantages of the invention will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
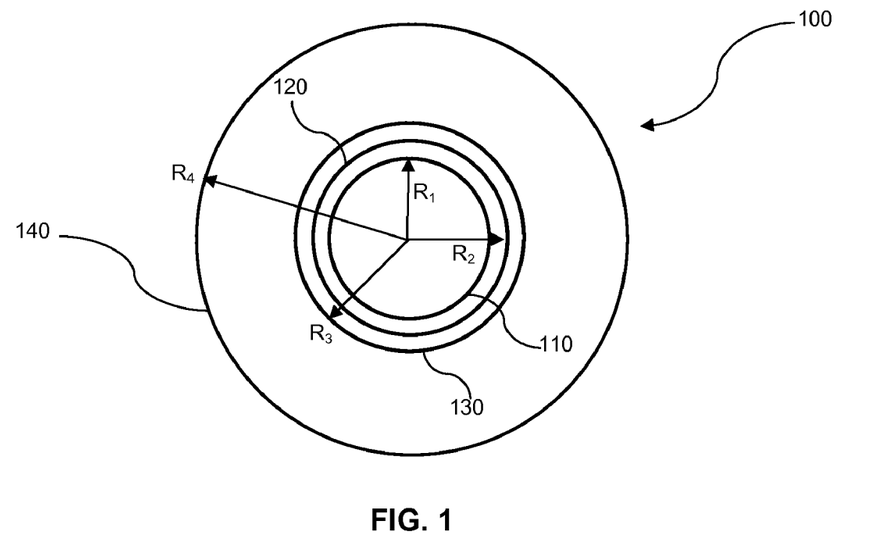
FIG. 1 schematically depicts a radial cross section of a bend resistant multimode optical fiber according to one or more embodiments shown and described herein.

Reference will now be made in detail to embodiments of bend resistant multimode optical fibers, examples of which are illustrated in the accompanying drawings. FIG. 1 schematically depicts a cross section of an optical fiber according to one or more embodiments shown and described herein. The optical fiber generally comprises a core, an inner cladding, a low index ring and an outer cladding. The structure of the optical fibers as well as the properties of the optical fibers will be described in more detail herein. Whenever possible, the same reference numerals will be used throughout the drawings to refer to the same or like parts.

The phrase "refractive index profile," as used herein, refers to the relationship between refractive index or relative refractive index and optical fiber radius.

The phrase "relative refractive index percent," as used herein, is defined as $\Delta\% = 100 \times (n_i^2 - n_{REF}^2)/2n_i^2$, where $n_i$ is the maximum refractive index in region i, unless otherwise specified. The relative refractive index percent is measured at 1300 nm unless otherwise specified. Unless otherwise specified herein, $n_{REF}$ is the average refractive index of the outer cladding 140, which can be calculated, for example, by taking "N" index measurements ($n_{C1}$, $n_{C2}$, ... $n_{CN}$) in the outer annular region of the cladding (which in some preferred embodiments may be undoped silica), and calculating the average refractive index by:

$$n_C = (1/N) \sum_{i=1}^{i=N} n_{Ci}$$

As used herein, the relative refractive index is represented by $\Delta$ and its values are given in units of "%," unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

Macrobend performance is measured according to FOTP-62 (IEC-60793-1-47) by wrapping 1 turn around either a 6 mm, 10 mm, 15 mm, 20 mm, 30 mm or other diameter mandrel as stated (e.g. "1×10 mm diameter macrobend loss" or the "1×15 mm diameter macrobend loss") and measuring the increase in attenuation due to the bending using an over-filled launch (OFL) condition. The minimum calculated effective modal bandwidths (Min EMBc) may be measured differential mode delay spectra as specified by TIA/EIA-455-220.

Bandwidth may be measured at 1300 nm (unless another wavelength is specified) according to FOTP-204 with over-filled launch.

As used herein, numerical aperture of the fiber means numerical aperture as measured using the method set forth in TIA SP3-2839-URV2 FOTP-177 IEC-60793-1-43 titled "Measurement Methods and Test Procedures-Numerical Aperture."

The term "α-profile" or "alpha profile" refers to a relative refractive index profile, expressed in terms of $\Delta(r)$ which is in units or "%", where r is the radius, which follows the equation, $$\Delta(r) = \Delta(r_0)(1 - [|r - r_0|/(r_1 - r_0)]^\alpha),$$

where $r_0$ is the point at which $\Delta(r)$ is maximum, $r_1$ is the point at which $\Delta(r)\%$ is zero with respect to pure silica glass, and r is in the range $r_i \leq r \leq r_f$, where $\Delta$ is defined above, $r_i$ is the initial point of the α-profile, $r_f$ is the final point of the α-profile, and α is an exponent which is a real number. For a profile segment beginning at the centerline (r=0), the α-profile has the simpler form $$\Delta(r) = \Delta(0)(1 - [|r|/(r_1)]^\alpha),$$

where $\Delta(0)$ is the refractive index delta at the centerline.

The optical core diameter $2*R_{opt}$ is measured using the technique set forth in IEC 60793-1-20, titled "Measurement Methods and Test Procedures—Fiber Geometry," in particular using the reference test method outlined in Annex C thereof titled "Method C: Near-field Light Distribution." To calculate the optical core radius $R_{opt}$ from the results using this method, a 10-80 fit is applied per section C.4.2.2 to obtain the optical core diameter, which is then divided by 2 to obtain the optical core radius.

The low index ring has a profile volume, $V_3$, defined herein as:

$$2 \int_{R_i}^{R_o} \Delta(r) r \, dr$$

where $R_i$ is the innermost radius where $\Delta_2(r)\%$ is negative with respect to the outer cladding and $R_o$ is the outermost radius of the depressed-index annular region where $\Delta_3(r)\%$ is negative with respect to an outer cladding after passing through a minimum. For the fibers disclosed herein, the absolute magnitude of $V_3$ is preferably greater than 50%-$\mu m^2$, more preferably greater than 140%-$\mu m^2$. In some cases, $V_3$ is greater than 180%-$\mu m^2$ or even greater than 200%-$\mu m^2$.

Referring to FIG. 1, a cross section of an optical fiber 100 multi-moded at 1300 nm is schematically illustrated. The optical fiber generally comprises a core 110 an inner cladding 120, a low index ring 130, and an outer cladding 140 each of which is formed from silica-based glass. The cross section of the optical fiber 100 may be generally circular-symmetric with respect to the center of the core 110.

In the embodiments described herein the core 110 generally comprises silica glass doped with one or more dopants which increase the index of refraction of the glass. In some embodiments, the core comprises silica doped with germanium (i.e., germania ($GeO_2$). However, it should be understood that dopants other than germanium such as $Al_2O_3$ or $P_2O_5$, individually or in combination, may be employed within the core. In some embodiments, the refractive index profile of the optical fiber disclosed herein is non-negative from the centerline to the outer radius of the core. In some embodiments, the optical fiber contains no index-decreasing dopants in the core 110. When dopants are present in the core, the dopants may be distributed throughout the core to obtain the desired refractive index profile. The core 110 has a relative refractive index percent $\Delta_1\%$ relative to the outer cladding and a maximum relative refractive index percent $\Delta_{1Max}\%$ of greater than 1.6% and less than 2.2%, more preferably greater than 1.6% and less than 2.0%, and, most preferably, greater than 1.6% and less than 1.9%. The numerical aperture of the core is greater than 0.23, more preferably from about 0.26 to 0.31, and even more preferably from about 0.27 to about 0.29.

The core 110 has a graded index in a radial direction from the center of the core such that the refractive index profile of the core has a parabolic or substantially parabolic shape. In some embodiments the refractive index profile of the core has core alpha profile with an α value ($\alpha_C$) between 1.9 and 2.1 as measured at 1300 nm. In some embodiments the refractive index profile of the core may have a centerline dip such that the maximum relative refractive index percent $\Delta_{1Max}\%$ of the core 110 (and the maximum relative refractive index percent of the entire optical fiber) is located a small distance away from the centerline of the optical fiber. However, in other embodiments, the refractive index profile of the core has not centerline dip such that the maximum relative refractive index percent $\Delta_{1Max}\%$ of the core 110 (and the maximum relative refractive index percent of the entire optical fiber) is located at the center of the optical fiber.

The core 110 generally has a physical core radius $R_1$ and an optical core radius $R_{opt}$. The physical core radius, as used herein, is the radius at which the relative refractive index percent $\Delta_1\%$ of the core first reaches zero in a radial direction from the center of the core 110. The optical core radius $R_{opt}$, as used herein, is half of the optical core diameter. For refractive index profiles of the type shown in FIG. 2, $R_{opt}$ is approximately equal to $R_2$. For refractive index profiles of the type shown in FIG. 3, $R_1 \leq R_{opt} \leq R_2$ and is modeled by determining the radius at which the refractive index equals the effective refractive index of the highest mode group with leaky losses of less than 1 dB/m. In the embodiments depicted in FIGS. 2 and 3, $R_2$ is the innermost radius at which the relative refractive index of the optical fiber first reaches a minimum in a radial direction from the center of the core 110. In the embodiments shown and described herein, the core 110 has a physical core radius $R_1$ from 26 microns to 33 microns, more preferably less than 31 microns, even more preferably less than 30.5 microns and, most preferably, less than 30 microns. Further, in the embodiments described herein the core 110 has an optical core radius $R_{opt}$ from 28 microns to 34 microns, more preferably from 29 to 33 microns and, most preferably, from 30 to 32.5 microns.

The inner cladding 120 surrounds and is in direct contact with the core 110 and extends from the physical core radius $R_1$ to the radius $R_2$. Accordingly, it should be understood that the inner cladding has a radial thickness $T_2=R_2-R_1$. In the embodiments described herein, the radial thickness $T_2$ of the inner cladding 120 is generally from about 0.5 microns to about 5.0 microns.

The inner cladding 120 has a relative refractive index percent $\Delta_2\%$ relative to the outer cladding 140 and a minimum relative refractive index percent $\Delta_{2Min}\%$ and a maximum relative refractive index $\Delta_{2Max}\%$. The inner cladding 120 may comprise silica glass which is substantially free from dopants (i.e., the inner cladding 120 is formed from pure silica glass). Alternatively, the inner cladding 120 may comprise one or more dopants which increase or decrease the index of refraction of the inner cladding 120. However, the maximum relative refractive index percent $\Delta_{2Max}\%$ of the inner cladding 120 will generally be less than or equal to the relative refractive index percent $\Delta_1\%$ of the core and, more specifically, the maximum relative refractive index percent $\Delta_{2Max}\%$ of the inner cladding 120 is less than the maximum relative refractive index percent $\Delta_{1Max}\%$ of the core 110.

Figure 2:
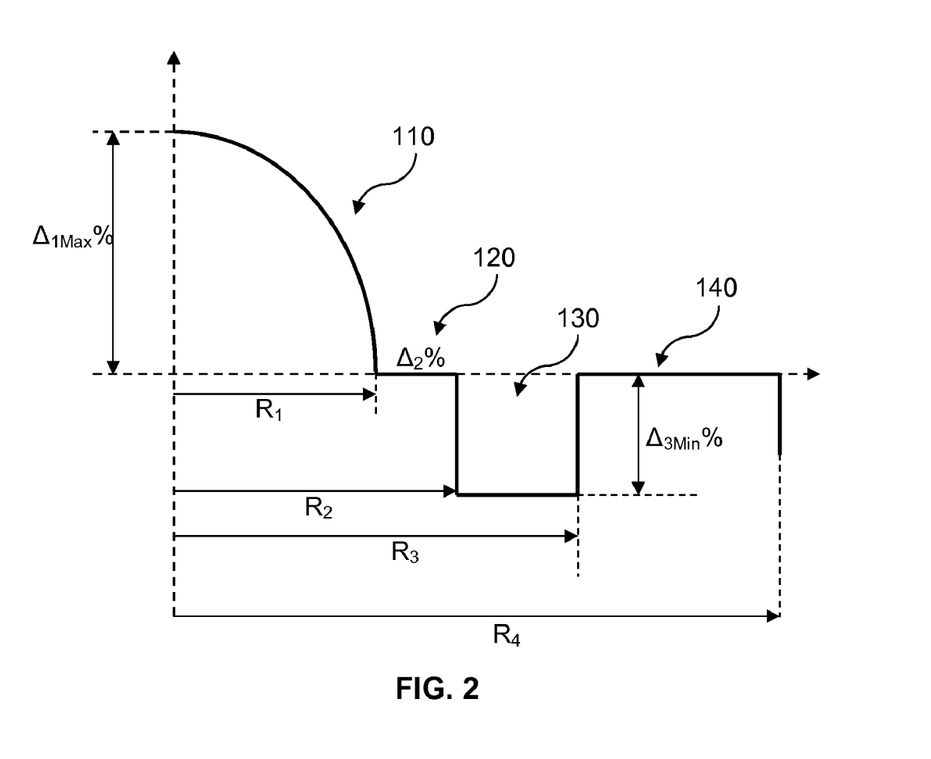
FIG. 2 graphically illustrates the relative refractive index percent as a function of radius according to one or more embodiments of a bend resistant optical fiber shown and described herein.

Referring now to FIG. 2, the relative refractive index percent as a function of the radius of an optical fiber is graphically depicted for a bend resistant optical fiber according to one or more embodiments shown and described herein. In the embodiment of the bend resistant optical fiber depicted in FIG. 2, the relative refractive index percent $\Delta_2\%$ is substantially uniform through the radial thickness of the inner cladding 120. For example, in one embodiment shown in FIG. 2, the maximum relative refractive index percent $\Delta_{2Max}\%$ and the minimum relative refractive index percent $\Delta_{2Min}\%$ are the same (i.e., $\Delta_{2Max}\%=\Delta_{2Min}\%$). In another embodiment, the difference between $\Delta_{2Max}\%$ and $\Delta_{2Min}\%$ is less than or equal to 0.1% (i.e., $\Delta_{2Max}\%-\Delta_{2Min}\% \leq 0.1\%$) such that the relative refractive index percent $\Delta_2\%$ is substantially uniform through the radial thickness of the inner cladding. For example, in one embodiment, $\Delta_{2Max}\% \leq 0.05\%$ while $\Delta_{2Min}\% \geq -0.05\%$ such that the difference between $\Delta_{2Max}\%$ and $\Delta_{2Min}\%$ is less than or equal to 0.1%. In embodiments where the relative refractive index percent $\Delta_2\%$ is substantially uniform through the radial thickness of the inner cladding 120, the radial thickness of the inner cladding 120 is from about 0.5 microns to about 4.0 microns, more preferably from about 0.75 microns to about 2 microns and, most preferably, from about 0.1 micron to about 1.5 microns. Further, in these embodiments, the physical core radius $R_1$ is from about 27 microns to about 33 microns, more preferably from about 28 microns to about 32 microns and, most preferably, from about 29 microns to about 31 microns.

While FIG. 2 depicts the relative refractive index $\Delta_2\%$ of the inner cladding 120 as being substantially uniform through the radial thickness $T_2$ of the inner cladding 120, it should be understood that in other embodiments the relative refractive index $\Delta_2\%$ may vary through the radial thickness of the inner cladding 120.

Figure 3:
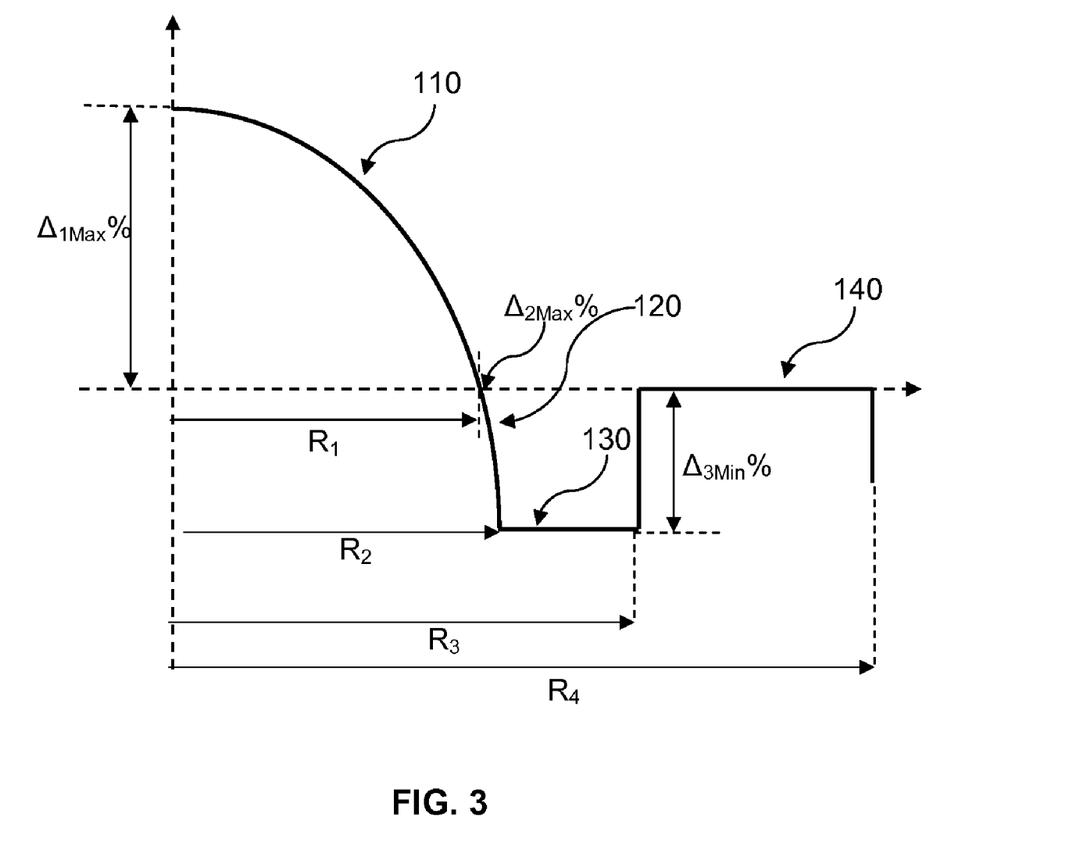
FIG. 3 graphically illustrates the relative refractive index percent as a function of radius according to one or more embodiments of a bend resistant optical fiber shown and described herein.

For example, referring to FIG. 3, a refractive index profile of one embodiment of a bend resistant multimode optical fiber is graphically illustrated where the relative refractive index percent $\Delta_2\%$ varies through the radial thickness of the inner cladding 120. In one embodiment, the index of refraction of the inner cladding decreases between $R_1$ and $R_2$ such that the relative refractive index percent $\Delta_2\%$ is graded in a radial direction, as depicted in FIG. 3. For example, the refractive index profile of the inner cladding may have an inner cladding alpha profile with an $\alpha$ value ($\alpha_{IC}$). In some embodiments, the refractive index profile of the inner cladding 120 may be an extension of the refractive index profile of the core 110. For example, the inner cladding may have an $\alpha$ value $\alpha_{IC}$ from about 1.9 to about 2.1 such that the inner cladding is a continuation of the graded index profile of the core. In this embodiment the graded index of the refraction of the core continues past $R_1$ and into the inner cladding 120 where the relative refractive index percent $\Delta_2\%$ is negative between $R_1$ and $R_2$.

In another embodiment, the $\alpha$-shape of the inner cladding 120 is a function of the $\alpha$-shape of the core 110. For example, in this embodiment, the inner cladding may have an $\alpha$ value $\alpha_{IC}$ from $0.8*\alpha_C$ to $1.2*\alpha_C$. In this embodiment the graded index of refraction of the core also continues past $R_1$ and into the inner cladding 120 where the relative refractive index percent $\Delta_2\%$ is negative between $R_1$ and $R_2$. However, in this embodiment the $\alpha$-shape of the inner cladding may be slightly different than the $\alpha$-shape of the core. In either embodiment the inner cladding 120 has a maximum relative refractive index percent $\Delta_{2Max}\%$ at $R_1$, which decreases over the radial thickness of the inner cladding to a minimum relative refractive index percent $\Delta_{2Min}\%$ at $R_2$. Accordingly, it should be understood that $\Delta_1\% \geq \Delta_{2Max}\%$ and $\Delta_{1Max}\% > \Delta_{2Max}\%$. In these embodiments $\Delta_{2Max}\% < -0.05\%$.

Further, where the relative refractive index percent $\Delta_2\%$ varies through the radial thickness of the inner cladding 120, the inner cladding 120 has radial thickness $T_2$ from about 1 micron to about 5 microns, more preferably greater than about 1.5 microns and, most preferably, greater than about 2.0 microns. Further, in these embodiments, the physical core radius is from about 26 microns to about 31 microns, more preferably from about 27 microns to about 30 microns.

Referring now to FIGS. 1-3, the low index ring 130 surrounds and is in direct contact with the inner cladding 120 such that the low index ring 130 is spaced apart from the core 110. The low index ring extends from the optical radius $R_2$ to a radius $R_3$ such that the low index ring has a radial thickness $T_3=R_3-R_2$. The radius $R_3$, as used herein, refers to the radius of the optical fiber 100 at which the relative refractive index of the optical fiber 100 reaches a value of 0.05% after passing through a minimum in the radial direction from the centerline of the optical fiber. In the embodiments described herein the radial thickness $T_3$ of the low index ring 130 may be from about 2.0 microns to about 8.0 microns, more preferably from about 4 microns to about 6 microns. The low index ring 130 may be formed from silica glass which includes one or more dopants which decrease the index of refraction of the silica glass. For example, the low index ring 130 may include silica glass doped with fluorine, boron or various combinations thereof. However, it should be understood that other dopants may be used to decrease the index of refraction of the low index ring 130.

The low index ring 130 generally has a relative refractive index percent $\Delta_3\%$ with respect to the outer cladding with a minimum relative refractive index percent $\Delta_{3Min}\%$ and a maximum relative refractive index percent $\Delta_{3Max}\%$. The relative refractive index $\Delta_3\%$ of the low index ring 130 is less than zero through the radial thickness of the low index ring. In one embodiment, the relative refractive index percent $\Delta_3\%$ is substantially uniform through the radial thickness of the low index ring 130 (i.e., from $R_2$ to $R_3$) such that $\Delta_{3Min}\%=\Delta_{3Max}\%$. However, it should be understood that, in other embodiments, $\Delta_3\%$ may vary between $R_2$ and $R_3$. In general, the relative refractive index $\Delta_3\%$ of the low index ring 130 is less than or equal to $\Delta_{2Min}\%$. As described hereinabove, the low index ring 130 may have a profile volume $V_3$ with an absolute magnitude preferably greater than 50%-$\mu m^2$, more preferably greater than 100%-$\mu m^2$ and even more preferably greater than 140%-$\mu m^2$.

An outer cladding 140 is disposed around the low index ring 130 such that the outer cladding 140 surrounds and is in direct contact with the low index ring 130. The outer cladding 140 extends from $R_3$ to $R_4$. In the embodiments described herein, $R_4$ may be from about 40 microns to about 62.5 microns. The outer cladding 140 may generally have a radial thickness $T_4=R_4-R_3$. In the embodiments described herein, $T_4$ may be from about 10 microns to about 30 microns, more preferably less than about 25 microns. In some embodiments the outer cladding 140 is formed from pure silica glass. The term pure silica glass, as used herein, means that the silica glass does not contain dopants in concentrations which would significantly modify (i.e., increase or decrease) the index of refraction of pure silica glass. In these embodiments, the relative index of refraction $\Delta_4\%$ of the outer cladding 140 is zero relative to pure silica glass. In other embodiments, the outer cladding 140 has a maximum relative index of refraction percent $\Delta_{4Max}\%$ which is less than 0.05% and a minimum relative index of refraction percent $\Delta_{4Min}\%$ which is greater than −0.05%. In this embodiment, the low index ring 130 ends where $\Delta_3\%$ reaches a value of greater than −0.05% going radially outward after passing through $\Delta_{3Min}\%$. In general, the outer cladding 140 has a relative refractive index $\Delta_4\%$ such that $\Delta_{1Max}\%>\Delta_4\%\geq\Delta_{2Max}\%$.

Accordingly, the glass portion of the optical fiber 100 (e.g., the core 102, the inner cladding 104, the low index ring 106, and the outer cladding 108) may have a diameter of $2R_4$. In the embodiments described herein, the diameter of the glass portion of the optical fiber is between 120 and 130 µm, preferably about 125 µm.

The optical fiber 100 shown in FIG. 1 may be formed by conventional fiber manufacturing techniques. For example, the various layers (e.g., the inner cladding 120, the low index ring 130, and the outer cladding 140) may be formed on a core cane member to create a fiber preform using various vapor phase deposition techniques such as chemical vapor deposition (CVD), modified chemical vapor deposition (MCVD), or any other vapor phase deposition technique used in the manufacture of optical fiber preforms. Alternatively, the fiber preform may be formed using rod-in-tube techniques where a core cane member is "sleeved" with a glass tube or tubes having the desired characteristics. The resulting fiber preform formed from the aforementioned processes may thereafter be drawn into optical fiber.

After the optical fiber 100 is drawn from the fiber preform, the optical fiber 100 may be coated with one or more coatings (not shown). For example, in one embodiment, optical fiber 100 may be coated with a low modulus primary coating and a high modulus secondary coating.

Optical fibers according to the embodiments described herein have large numerical apertures (e.g., NA$\geq$0.23) and overfilled launch (OFL) bandwidths at 1300 nm of greater than 1000 MHz-km, more preferably greater than 1500 MHz-km and, more preferably, greater than 2000 MHz-km. In some embodiments, the OFL bandwidth at 1300 nm of the optical fibers described herein is greater than 3000 MHz-km, more preferably greater than 4000 MHz-km and, most preferably, greater than 5000 MHz-km. In addition, optical fibers according to the embodiments described herein have improved bending performance. For example, the optical fibers exhibit a 1×10 mm diameter macrobend loss of less than 0.2 dB at a wavelength of 1300 nm, more preferably less than 0.1 dB and, most preferably, less than 0.05 dB.

EXAMPLES

The various embodiments of optical fibers will be further clarified by the following modeled examples of various embodiments of the high numerical aperture, bend resistant optical fibers set forth in Tables 1-4 below. Specifically, Tables 1-4 list various modeled values for $\Delta_{1Max}\%$, $R_1$, $\alpha_C$, $\Delta_{2Max}\%$, $R_2$, $\Delta_{3Max}\%$, $R_3$, $V_3$, the OFL bandwidth of the optical fiber at 1300 nm, and the 1×10 mm diameter macrobend loss for 20 modeled optical fibers.

Examples 1-6

The optical fiber examples contained in Table 1 have physical core radii fixed at 31.25 microns while the maximum relative refractive index $\Delta_{1Max}\%$ of the core ranges from about 1.9% to about 2.0%. The embodiments of the optical fibers shown in Table 1 have numerical apertures of 0.29 and optical core diameters of greater than 62.5 microns.

Figure 4:
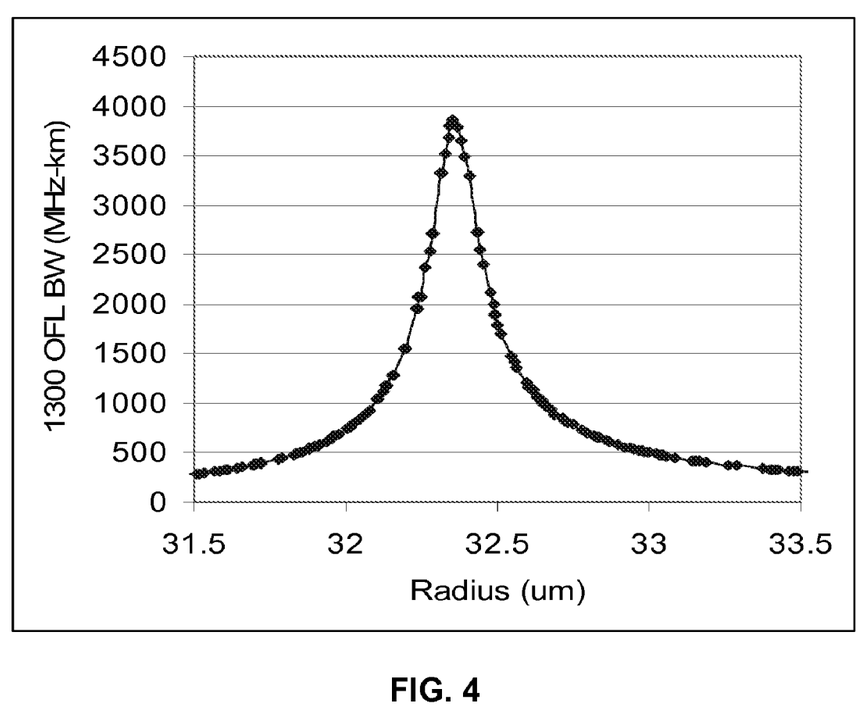
FIG. 4 graphically depicts the modeled 1300 nm bandwidth of a bend resistant multimode optical fiber as a function of the spacing between the physical core and the depressed index ring.

Referring to FIG. 4, the modeled overfill launch (OFL) bandwidth at 1300 nm for an optical fiber according to one or more embodiments shown and described herein, is graphically depicted as a function of the radius $R_2$ of the inner cladding. The various data points comprising the curve represent optical fibers with a fixed optical core radius $R_1$ of 31.25 microns (i.e., optical fibers such as those described in Table 1). As shown in FIG. 4, high OFL bandwidths may be achieved when the radial thickness $T_2$ of the inner cladding is greater than about 0.5 microns and less than about 4 microns, more preferably greater than about 1 micron and less than 2 microns, and most preferably, greater than about 1 micron and less than about 1.5 microns. FIG. 4 also graphically demonstrates that a peak OFL bandwidth of greater than 3500 MHz-km may be achieved utilizing the fiber designs described herein.

TABLE 1

|  | Example1 | Example2 | Example3 | Example4 | Example5 | Example6 |
|---|---|---|---|---|---|---|
| $\Delta_{1Max}\%$ | 1.974 | 1.974 | 1.956 | 1.977 | 1.963 | 1.963 |
| $R_1$ (μm) | 31.25 | 31.25 | 31.25 | 31.25 | 31.25 | 31.25 |
| $\alpha_c$ | 2.000 | 2.000 | 1.999 | 1.987 | 1.991 | 1.991 |
| $\Delta_{2Max}\%$ | 0 | 0 | 0 | 0 | 0 | 0 |
| $R_2$ (μm) | 32.48 | 32.58 | 32.70 | 32.67 | 32.35 | 32.24 |
| $R_{opt}$ (μm) | 32.48 | 32.58 | 32.70 | 32.67 | 32.35 | 32.24 |
| $\Delta_{3Min}\%$ | −0.45 | −0.45 | −0.45 | −0.55 | −0.36 | −0.36 |
| $R_3$ (μm) | 37.75 | 37.75 | 39.03 | 37.00 | 39.63 | 39.63 |
| $V_3$ (%-sq. μm) | −166.5 | −163.6 | −202.6 | −166.0 | −190.0 | −192.6 |
| $R_4$ (μm) | 62.5 | 62.5 | 62.5 | 62.5 | 62.5 | 62.5 |
| BW1300 (MHz-km) | 2157 | 2789 | 1777 | 3096 | 3864 | 2077 |
| Optical Core Diameter (μm) | 65.0 | 65.2 | 65.4 | 65.3 | 64.7 | 64.5 |
| 1 × 10 mm Bend Loss (dB/turn) | 0.04 | 0.04 | 0.02 | 0.04 | 0.03 | 0.03 |

Examples 7-10

The optical fiber examples contained in Table 2 have a physical core radius fixed at 31.25 microns, as with the optical fiber examples in Table 1. However, the maximum relative refractive index $\Delta_{1Max}\%$ of the core in optical fiber Examples 7-10 is less than 1.9%. Maintaining the maximum relative refractive index $\Delta_{1Max}\%$ below 1.9% reduces the numerical aperture NA of the optical fiber to approximately 0.28 which improves the compatibility of the optical fiber with existing 62.5 micron optical core diameter fiber. However, the fiber designs shown in Table 2 have improved OFL bandwidth at 1300 nm compared to existing 62.5 micron fibers in addition to low bend losses.

TABLE 2

|  | Example 7 | Example 8 | Example 9 | Example 10 |
|---|---|---|---|---|
| $\Delta_{1Max}\%$ | 1.829 | 1.760 | 1.796 | 1.855 |
| $R_1$ (μm) | 31.25 | 31.25 | 31.25 | 31.25 |
| $\alpha_c$ | 1.992 | 1.998 | 1.996 | 1.997 |
| $\Delta_{2Max}\%$ | 0 | 0 | 0 | 0 |
| $R_2$ (μm) | 32.63 | 32.73 | 32.66 | 32.68 |
| $R_{opt}$ (μm) | 32.63 | 32.73 | 32.66 | 32.68 |
| $\Delta_{3Min}\%$ | −0.48 | −0.48 | −0.48 | −0.48 |
| $R_3$ (μm) | 37.44 | 38.96 | 38.18 | 38.85 |
| $V_3$ (%-sq.μm) | −162 | −216 | −188 | −212 |
| $R_4$ (μm) | 62.5 | 62.5 | 62.5 | 62.5 |
| BW1300 (MHz-km) | 4311 | 4237 | 4090 | 4056 |
| Optical Core Diameter (μm) | 65.3 | 65.5 | 65.3 | 65.4 |
| 1 × 10 mm Bend Loss (dB/turn) | 0.04 | 0.02 | 0.03 | 0.02 |

Examples 11-16

The optical fiber examples contained in Table 3 have optical core diameters of 62.5 microns and numerical apertures NA of 0.28 which are compatible with existing 62.5 micron fiber designs. However, the fiber designs shown in Table 3 have improved OFL bandwidth at 1300 nm compared to existing 62.5 micron fibers in addition to low bend losses. Examples 15 and 16 are optical fiber designs with outer cladding diameters of 90 microns and 80 microns respectively.

TABLE 3

|  | Example11 | Example12 | Example13 | Example14 | Example15 | Example16 |
|---|---|---|---|---|---|---|
| $\Delta_{1Max}\%$ | 1.813 | 1.788 | 1.714 | 1.683 | 1.680 | 1.684 |
| $R_1$ (μm) | 29.88 | 29.82 | 29.84 | 29.81 | 29.71 | 29.70 |
| $\alpha_c$ | 1.994 | 1.997 | 1.999 | 2.000 | 1.999 | 2.003 |
| $\Delta_{2Max}\%$ | 0 | 0 | 0 | 0 | 0 | 0 |
| $R_2$ (μm) | 31.25 | 31.25 | 31.25 | 31.25 | 31.25 | 31.25 |
| $R_2$ (μm) | 31.25 | 31.25 | 31.25 | 31.25 | 31.25 | 31.25 |
| $\Delta_{3Min}\%$ | −0.48 | −0.48 | −0.45 | −0.45 | −0.52 | −0.52 |
| $R_3$ (μm) | 37.50 | 38.15 | 38.01 | 37.95 | 37.29 | 36.11 |
| $V_3$ (%-sq. μm) | −206 | −230 | −212 | −207 | −217 | −170 |
| $R_4$ (μm) | 62.5 | 62.5 | 62.5 | 62.5 | 45 | 40 |
| BW1300 (MHz-km) | 4599 | 4189 | 4286 | 3916 | 4783 | 3696 |
| Optical Core Diameter (μm) | 62.5 | 62.5 | 62.5 | 62.5 | 62.5 | 62.5 |
| 1 × 10 mm Bend Loss (dB/turn) | 0.02 | 0.02 | 0.02 | 0.02 | 0.02 | 0.04 |

Examples 17-20

The optical fiber examples contained in Table 4 have an inner cladding which has a graded index of refraction extending between the physical core radius $R_1$ and an outer core radius $R_2$. The optical fibers in these examples have R1≦Ropt≦R2, an optical core diameter of 62.5 microns with numerical apertures of at least 0.23, high OFL bandwidths at 1300 nm and low bend losses.

TABLE 4

|  | Example 17 | Example 18 | Example 19 | Example 20 |
|---|---|---|---|---|
| $\Delta_{1Max}$ (%) | 1.676 | 1.668 | 1.691 | 1.706 |
| $R_1$ (μm) | 28.01 | 28.19 | 27.88 | 29.38 |
| $\alpha_c$ | 1.996 | 1.996 | 1.995 | 1.994 |
| $R_2$ (μm) | 31.53 | 32.16 | 31.58 | 32.77 |
| $\Delta_{3Min}$ (%) | -0.436 | -0.491 | -0.461 | -0.404 |
| $R_3$ (μm) | 37.74 | 37.98 | 38.01 | 37.89 |
| $V_3$ (%-sq.μm) | -231 | -256 | -257 | -186 |
| $R_4$ (μm) | 62.5 | 62.5 | 62.5 | 62.5 |
| BW1300 (MHz-km) | 5188 | 5152 | 5105 | 5089 |
| Optical Core Diameter (μm) | 62.5 | 62.5 | 62.5 | 62.5 |
| 1 × 10 mm Bend Loss (dB/turn) | 0.02 | 0.01 | 0.01 | 0.03 |

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A bend resistant optical fiber which is multi-moded at 1300 nm comprising a core, an inner cladding, a low index ring and an outer cladding, wherein:
   the core is formed from silica-based glass and comprises a graded index of refraction with a core alpha profile where $1.9 \leq \alpha_C \leq 2.1$, a maximum relative refractive index percent $\Delta_{1Max}\%$ relative to the outer cladding, and a numerical aperture NA of greater than 0.23;
   the inner cladding surrounds and is in direct contact with the core, the inner cladding having a maximum relative refractive index percent $\Delta_{2Max}\%$ relative to the outer cladding, a minimum relative refractive index percent $\Delta_{2Min}\%$ relative to the outer cladding, and a radial thickness of at least 0.5 microns, wherein $\Delta_{1Max}\%$ is greater than $\Delta_{2Max}\%$;
   the low index ring that surrounds and is in direct contact with the inner cladding such that the low index ring is spaced apart from the core, the low index ring having a relative refractive index percent $\Delta_3\%$ relative to the outer cladding, a radial thickness of at least 0.5 microns and a profile volume with an absolute magnitude of greater than 50%-μm², wherein the minimum relative refractive index percent $\Delta_{2Min}\%$ of the inner cladding is greater than or equal to $\Delta_3\%$; and
   the outer cladding surrounds and is in direct contact with the low index ring, the outer cladding comprising a relative refractive index percent $\Delta_4\%$ relative to pure silica glass, wherein $\Delta_{1Max}\% > \Delta_4\% \geq \Delta_{2Max}\%$.

2. The optical fiber of claim 1 wherein a relative refractive index percent $\Delta_2\%$ of the inner cladding is substantially uniform through the radial thickness of the inner cladding such that $\Delta_{2Max}\% - \Delta_{2Min}\% \leq 0.1\%$.

3. The optical fiber of claim 2 wherein $\Delta_{2Max}\% \leq 0.05\%$ and $\Delta_{2Min}\% \geq -0.05\%$.

4. The optical fiber of claim 2 wherein the radial thickness of the inner cladding is less than or equal to 4 microns.

5. The optical fiber of claim 2 wherein a physical radius of the core is greater than or equal to 27 microns and less than or equal to 33 microns.

6. The optical fiber of claim 1 wherein the inner cladding comprises a graded index of refraction with an inner cladding alpha profile where $0.8 * \alpha_C \leq \alpha_{IC} \leq 1.2 * \alpha_C$.

7. The optical fiber of claim 6 wherein the minimum relative refractive index $\Delta_{2Min}\%$ of the inner cladding is less than -0.05%.

8. The optical fiber of claim 6 wherein the radial thickness of the inner cladding is greater than 1 micron.

9. The optical fiber of claim 6 wherein a physical radius of the core is greater than or equal to 26 microns and less than or equal to 31 microns.

10. The optical fiber of claim 1 wherein $0.26 \leq NA \leq 0.30$.

11. The optical fiber of claim 1 wherein $1.6\% \leq \Delta_{1Max}\% \leq 2.0\%$.

12. The optical fiber of claim 1 wherein the optical fiber exhibits a 1 turn 10 mm diameter mandrel wrap attenuation increase of less than or equal to 0.2 dB at 1300 nm.

13. The optical fiber of claim 1 wherein an optical radius of the core is greater than or equal to 28 microns and less than or equal to 34 microns.

14. The optical fiber of claim 1 wherein the fiber exhibits an overfilled bandwidth greater than 1000 MHz-km at 1300 nm.

15. A bend-resistant optical fiber which is multi-moded at 1300 nm comprising a core, an inner cladding, a low index ring, and an outer cladding, wherein:
   the core is formed from silica-based glass and comprises a graded index of refraction with a core alpha profile where $1.9 \leq \alpha_C \leq 2.1$, a maximum relative refractive index percent $\Delta_{1Max}\%$ relative to pure silica glass, and a numerical aperture NA of greater than 0.23;
   the inner cladding surrounds and is in direct contact with the core, the inner cladding having a graded index of refraction with an inner cladding alpha profile $\alpha_{IC}$, a maximum relative refractive index percent $\Delta_{2Max}\%$ relative to pure silica glass, and a minimum relative refractive index percent $\Delta_{2Min}\%$ relative to pure silica glass, wherein $\Delta_{1Max}\% > \Delta_{2Max}\%$;
   the low index ring surrounds and is in direct contact with the extended core region such that the low index ring is spaced apart from the core, the low index ring having a relative refractive index percent $\Delta_3\%$ relative to pure silica glass, a radial thickness of at least 1 micron and a profile volume with an absolute magnitude of greater than 50%-μm², wherein $\Delta_{2Min}\% \geq \Delta_3\%$;
   the outer cladding surrounds and is in direct contact with the low index ring, the outer cladding comprising a relative refractive index percent $\Delta_4\%$ relative to pure silica glass, wherein $\Delta_{1Max}\% > \Delta_4\% \geq \Delta_{2Max}\%$.

16. The optical fiber of claim 15 wherein a physical radius of the core is greater than or equal to 26 microns and less than or equal to 31 microns.

17. The optical fiber of claim 16 wherein $0.8 * \alpha_C \leq \alpha_{IC} \leq 1.2 * \alpha_C$.

18. A bend resistant optical fiber which is multi-moded at 1300 nm comprising a core, an inner cladding, a low index ring and an outer cladding, wherein:

the core is formed from silica-based glass and comprises a graded index of refraction with a core alpha profile where $1.9 \leq \alpha_C \leq 2.1$, a maximum relative refractive index percent $\Delta_{1Max}\%$ relative to pure silica glass, and a numerical aperture NA of greater than 0.23;

the inner cladding surrounds and is in direct contact with the core, the inner cladding having a maximum relative refractive index percent $\Delta_{2Max}\%$ relative to pure silica glass, a minimum relative refractive index percent $\Delta_{2Min}\%$ relative to pure silica glass, a radial thickness of at least 0.5 microns, wherein $\Delta_{2Max}\% - \Delta_{2Min} \leq 0.1\%$ and $\Delta_{1Max}\% > \Delta_{2Max}\%$;

the low index ring that surrounds and is in direct contact with the inner cladding such that the low index ring is spaced apart from the core, the low index ring having a relative refractive index percent $\Delta_3\%$ relative to pure silica glass, a radial thickness of at least 0.5 microns and a profile volume with an absolute magnitude of greater than 50%-μm², wherein the minimum relative refractive index percent $\Delta_{2Min}\%$ of the inner cladding is greater than or equal to $\Delta_3\%$; and the outer cladding surrounds and is in direct contact with the low index ring, the outer cladding comprising a relative refractive index percent $\Delta_4\%$ relative to pure silica glass, wherein $\Delta_{1Max}\% > \Delta_4\% \geq \Delta_{2Max}\%$.

19. The optical fiber of claim 18 wherein $\Delta_{2Max}\% \leq 0.05\%$ and $\Delta_{2Min}\% \leq -0.05\%$.

20. The optical fiber of claim 18 wherein the radial thickness of the inner cladding is less than or equal to 4 microns.

* * * * *